(12) United States Patent
Matsumura

(10) Patent No.: US 10,346,028 B2
(45) Date of Patent: Jul. 9, 2019

(54) CONTROLLING LAYOUT OF A DISPLAY

(71) Applicant: SONY CORPORATION, Minato-ku (JP)

(72) Inventor: Nao Matsumura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 850 days.

(21) Appl. No.: 14/387,303

(22) PCT Filed: Apr. 16, 2013

(86) PCT No.: PCT/JP2013/061315
§ 371 (c)(1),
(2) Date: Sep. 23, 2014

(87) PCT Pub. No.: WO2013/183370
PCT Pub. Date: Dec. 12, 2013

(65) Prior Publication Data
US 2015/0089447 A1    Mar. 26, 2015

(30) Foreign Application Priority Data
Jun. 5, 2012    (JP) .................................. 2012-127802

(51) Int. Cl.
*G06F 3/0488*    (2013.01)
*G06F 3/0484*    (2013.01)
*G06F 3/0482*    (2013.01)

(52) U.S. Cl.
CPC .......... *G06F 3/0488* (2013.01); *G06F 3/0482* (2013.01); *G06F 3/04842* (2013.01); *G06F 3/04886* (2013.01)

(58) Field of Classification Search
CPC .. G06F 3/0488; G06F 3/04842; G06F 3/0482; G06F 3/04886

USPC ........................................................ 715/810
See application file for complete search history.

(56) References Cited

U.S. PATENT DOCUMENTS

| | | | |
|---|---|---|---|
| 2002/0033848 A1* | 3/2002 | Sciammarella | G06F 3/0481 715/838 |
| 2005/0225540 A1* | 10/2005 | Kawakami | G06F 3/04842 345/173 |
| 2007/0055947 A1* | 3/2007 | Ostojic | G06T 3/0025 715/800 |

(Continued)

FOREIGN PATENT DOCUMENTS

| | | |
|---|---|---|
| EP | 1148412 A2 | 10/2001 |
| EP | 1847915 A2 | 10/2007 |

(Continued)

OTHER PUBLICATIONS

International Search Report dated Jul. 30, 2013 in PCT/JP2013/061315.

(Continued)

*Primary Examiner* — John T Repsher, III
(74) *Attorney, Agent, or Firm* — Chip Law Group

(57) ABSTRACT

There is provided an information processing device including a region control unit that provides a plurality of objects arranged in a predetermined direction with a detection region that detects contact or proximity of a pointing member, and conducts control in a manner that a plurality of modes exist with differing states of overlap between ranges in the predetermined direction of the detection region for the objects that neighbor each other.

14 Claims, 8 Drawing Sheets

(56) References Cited

U.S. PATENT DOCUMENTS

| | | | | |
|---|---|---|---|---|
| 2007/0250786 A1* | 10/2007 | Jeon | ................... | G06F 3/0482 |
| | | | | 715/765 |
| 2008/0184171 A1* | 7/2008 | Sato | ................... | G06F 3/0482 |
| | | | | 715/841 |
| 2010/0169834 A1 | 7/2010 | Wakizaka et al. | | |
| 2010/0199208 A1* | 8/2010 | Tokunaga | ........... | G06F 3/03549 |
| | | | | 715/777 |
| 2010/0283746 A1* | 11/2010 | Vuong | ................ | G06F 3/04886 |
| | | | | 345/173 |
| 2011/0009103 A1* | 1/2011 | Do | ....................... | G06F 3/0482 |
| | | | | 455/414.3 |
| 2011/0283225 A1* | 11/2011 | Chaudhri | .............. | G06F 3/0485 |
| | | | | 715/786 |
| 2012/0052921 A1 | 3/2012 | Lim et al. | | |

FOREIGN PATENT DOCUMENTS

| | | | |
|---|---|---|---|
| JP | 2005-352924 A | 12/2005 | |
| JP | 2006-103363 A | 4/2006 | |
| JP | 2009-259110 A | 11/2009 | |
| JP | 2010-92219 A | 4/2010 | |
| JP | 2010-152827 A | 7/2010 | |

OTHER PUBLICATIONS

Office Action for CN Patent Application No. 201380028279.8, dated Mar. 3, 2017, 8 pages.

Office Action for CN Patent Application No. 201380028279.8, dated Oct. 31, 2017, 10 pages of Office Action and 16 pages of English Translation.

\* cited by examiner

CONTROLLING LAYOUT OF A DISPLAY

TECHNICAL FIELD

The present disclosure relates to an information processing device, an information processing method, and a recording medium storing a computer program.

BACKGROUND ART

Devices equipped with a touch panel on a screen that enable a user to perform an operation by directly touching the screen, such as mobile phones, music players, and digital cameras, are becoming widely prevalent. In the user interfaces used in such devices, regions that sense the user's touch exist for individual items, and are often used for item selection.

In such devices, as the displayed information or items increase, the surface area of a region that the user may touch becomes smaller, and operability is lowered. Consequently, there is proposed technology that enables operability to be improved without impeding an information display function on a touch panel installable in compact equipment (see Patent Literature 1, for example).

CITATION LIST

Patent Literature

Patent Literature 1: JP 2011-134111A

SUMMARY OF INVENTION

Technical Problem

With the technology described in Patent Literature 1, a contactable region changes shape according to the shape of a finger close to the screen, but since the size of the contactable region and the display region is changed every time a finger approaches the screen, the display of the screen changes due to the user's movement. For this reason, the display changes within a short time, perception of the displayed items themselves becomes difficult, and operability is lowered in some cases. In addition, since proximity sensing is assumed to be available, it is necessary to prepare a separate device.

Accordingly, the present disclosure provides a new and improved information processing device, information processing method, and recording medium storing a computer program that presents to a user a user interface in which items are easy to perceive, without lowering operability.

Solution to Problem

According to the present disclosure, there is provided an information processing device including a region control unit that provides a plurality of objects arranged in a predetermined direction with a detection region that detects contact or proximity of a pointing member, and conducts control in a manner that a plurality of modes exist with differing states of overlap between ranges in the predetermined direction of the detection region for the objects that neighbor each other.

According to the present disclosure, there is provided an information processing method including a step of providing a plurality of objects arranged in a predetermined direction with a detection region that detects contact or proximity of a pointing member, and a step of conducting control in a manner that a plurality of modes exist with differing states of overlap between ranges in the predetermined direction of the detection region for the objects that neighbor each other.

According to the present disclosure, there is provided a recording medium having a computer program recorded thereon, the computer program causing a computer to execute a step of providing a plurality of objects arranged in a predetermined direction with a detection region that detects contact or proximity of a pointing member, and a step of conducting control in a manner that a plurality of modes exist with differing states of overlap between ranges in the predetermined of the detection region for the objects that neighbor each other.

Advantageous Effects of Invention

According to the present disclosure as described above, it is possible to provide a new and improved information processing device, information processing method, and recording medium storing a computer program that presents to a user a user interface in which items are easy to perceive, without lowering operability.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will proceed in the following order.

<1. Embodiment of present disclosure>
[Exemplary exterior of information processing device]
[Exemplary functional configuration of information processing device]
[Exemplary operations of information processing device]
<2. Conclusion>
<1. Embodiment of Present Disclosure>
[Exemplary Exterior of Information Processing Device]

Figure 1:
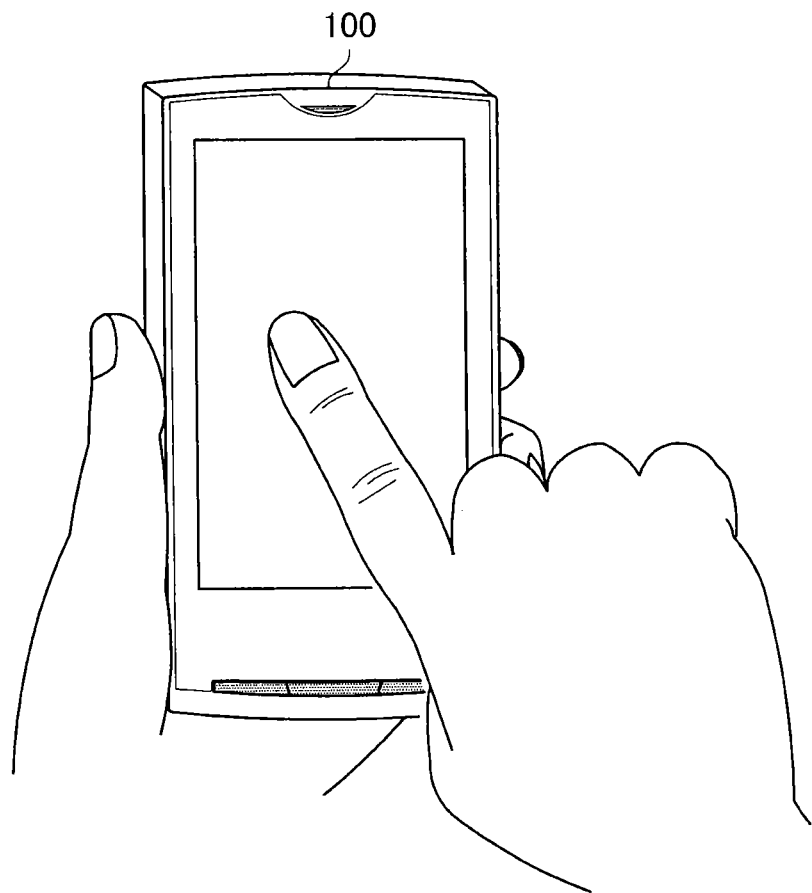
FIG. 1 is an explanatory diagram illustrating an exemplary exterior of an information processing device 100 according to an embodiment of the present disclosure.

First, an exemplary exterior of an information processing device according to an embodiment of the present disclosure will be described with reference to the drawings. FIG. 1 is an explanatory diagram illustrating an exemplary exterior of an information processing device 100 according to an embodiment of the present disclosure. Hereinafter, FIG. 1 will be used to describe an exemplary exterior of an information processing device 100 according to an embodiment of the present disclosure.

As illustrated in FIG. 1, the information processing device 100 according to an embodiment of the present disclosure enables a user to perform operations by directly touching a screen with a finger. FIG. 1 illustrates a smartphone as an example of the information processing device 100. However, in the present disclosure, the information processing device 100 is not limited to such an example. Insofar as a device enables a user to perform operations by directly touching a screen with a finger, the embodiment of the present disclosure described hereinafter is similarly applicable. A device that enables a user to perform operations by directly touching a screen with a finger may be a tablet, a digital camera, a portable music player, or a portable game console, for example.

The information processing device 100 as illustrated in FIG. 1 enables information to be selected by having the user touch a region corresponding to information displayed on-screen with a finger, and executes a process based on the selected information. The smartphone illustrated in FIG. 1 as an example of the information processing device 100 has a screen size of approximately 4 inches to 5 inches. Recently, resolution improvements have enabled even screen sizes of approximately 4 inches to 5 inches to display extremely large amounts of information on a screen. However, since the range that may be touched by a person's finger does not become smaller beyond a certain degree, even if more information is displayed, enabling the user to select that information becomes difficult.

Consequently, the information processing device 100 according the present embodiment suitably controls the region that detects contact with the screen, thereby making it easier for the user to select information displayed on the screen, even if the amount of content to display on the screen increases.

The above thus uses FIG. 1 to describe an exemplary exterior of an information processing device 100 according to an embodiment of the present disclosure. Next, an exemplary functional configuration of an information processing device 100 according to an embodiment of the present disclosure will be described.

[Exemplary Functional Configuration of Information Processing Device]

Figure 2:
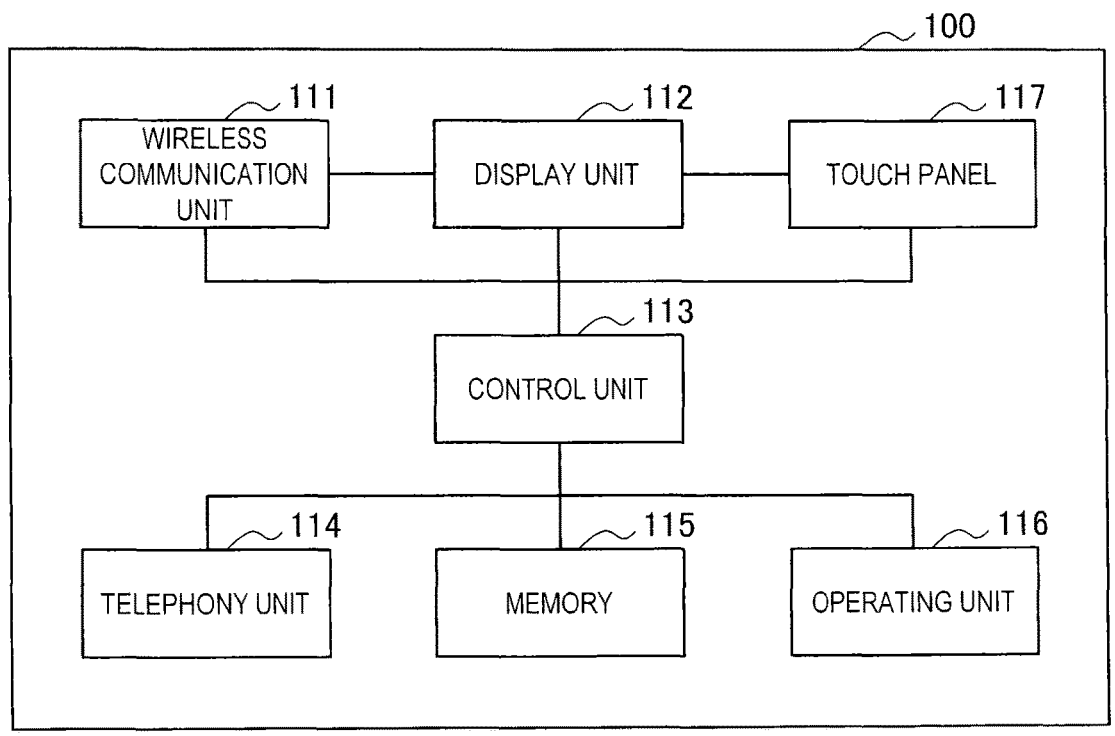
FIG. 2 is an explanatory diagram illustrating an exemplary functional configuration of an information processing device 100 according to an embodiment of the present disclosure.

FIG. 2 is an explanatory diagram illustrating an exemplary functional configuration of an information processing device 100 according to an embodiment of the present disclosure. Hereinafter, FIG. 2 will be used to describe an exemplary functional configuration of an information processing device 100 according to an embodiment of the present disclosure.

As illustrated in FIG. 2, the information processing device 100 according to an embodiment of the present disclosure includes a wireless communication unit 111, a display unit 112, a control unit 113, a telephony unit 114, memory 115, and an operating unit 116.

The wireless communication unit 111 wirelessly communicates with another device via a wireless network. The display unit 112 displays information received by the wireless communication unit 111 and information that depends on user operations performed on the operating unit 116. The display unit 112 is made up of a flat image display panel such as a liquid crystal display or an organic EL display, for example. Also, in the present embodiment, a touch panel 117 is provided on the display unit 112.

The control unit 113 controls operation of the information processing device 100. For example, the control unit 113 controls operation of the information processing device 100 by executing a program stored in the memory 115. The control of operation of the information processing device 100 by the control unit 113 may be control of the display of information on the display unit 112, or control of the detection region that detects contact or proximity of the user's finger on the touch panel 117, for example.

The telephony unit 114 is made up of a speaker and a microphone, for example, and executes voice-based telephony with another information processing device or a telephone. The memory 115 is made up of ROM, RAM, and the like, for example, and is used to store programs for controlling operation of the information processing device 100 and the like. The operating unit 116 is made up of buttons for operating the information processing device 100. In response to an operation on the operating unit 116, the operation of the information processing device 100 is controlled by the control unit 113. Note that in the present embodiment, the touch panel 117 is also part of the operating unit 116.

The above thus uses FIG. 2 to describe an exemplary functional configuration of an information processing device 100 according to an embodiment of the present disclosure. Next, an exemplary functional configuration of the control unit 113 illustrated in FIG. 2 will be described.

Figure 3:
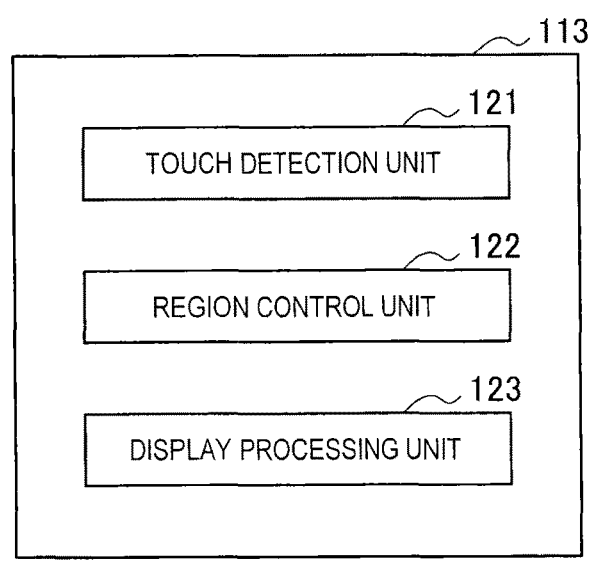
FIG. 3 is an explanatory diagram illustrating an exemplary functional configuration of a control unit 113.

FIG. 3 is an explanatory diagram illustrating an exemplary functional configuration of a control unit 113. Hereinafter, FIG. 3 will be used to describe an exemplary functional configuration of the control unit 113.

As illustrated in FIG. 3, the control unit 113 includes a touch detection unit 121, a region control unit 122, and a display processing unit 123.

The touch detection unit 121 detects contact or proximity of the user's finger on the touch panel 117. When detecting contact of the user's finger on the touch panel 117, the touch detection unit 121 acquires the contact coordinates, contact strength, and number of contact points. Also, when detecting proximity of the user's finger on the touch panel 117, the touch detection unit 121 acquires the proximity coordinates, proximity strength, and number of proximity points. The touch detection unit 121, after detecting contact or proximity of the user's finger on the touch panel 117, sends information obtained by detection to the display processing unit 123.

The region control unit 122 controls the display region of information to display on the display unit 112, and the state of a detection region that detects contact or proximity of the user's finger on the touch panel 117. The display processing unit 123 executes a display process for information to display on the display unit 112.

In the information processing device 100 according to the present embodiment, multiple objects are controlled by the region control unit 122 on the basis of a predetermined rule so as to be arranged on the display unit 112. The predetermined rule is, for example, following a predetermined direction on the display unit 112, as discussed later. Subsequently, detection regions that detect contact or proximity of the user's finger are provided in correspondence with these objects arranged by the region control unit 122. In addition, the region control unit 122 prepares multiple modes with differing states of overlap between detection regions for the regions of adjacent objects, selects one mode from among these modes, and controls the display region of information to display on the display unit 112 and the region that detects the contact of the user's finger on the touch panel 117.

The modes with differing states of overlap between detection regions for object regions may include, for example, a mode in which detection regions overlap with object regions, and a mode in which detection regions do not overlap with object regions. The region control unit 122 selects one mode from among these modes, and controls the display region of information to display on the display unit 112, and the state of a detection region that detects contact or proximity of the user's finger on the touch panel 117. The region control unit 122 switches back and forth between these two modes, and controls the display region of information to display on the display unit 112, and the state of a detection region that detects contact or proximity of the user's finger on the touch panel 117. The control of the display region of information to display on the display unit 112 and the state of a detection region that detects contact or proximity of the user's finger on the touch panel 117 by the region control unit 122 will be discussed later in detail.

The above thus uses FIG. 3 to describe an exemplary functional configuration of the control unit 113. Next, exemplary operations of an information processing device 100 according to an embodiment of the present disclosure will be described.

[Exemplary Operations of Information Processing Device]

Figure 4:
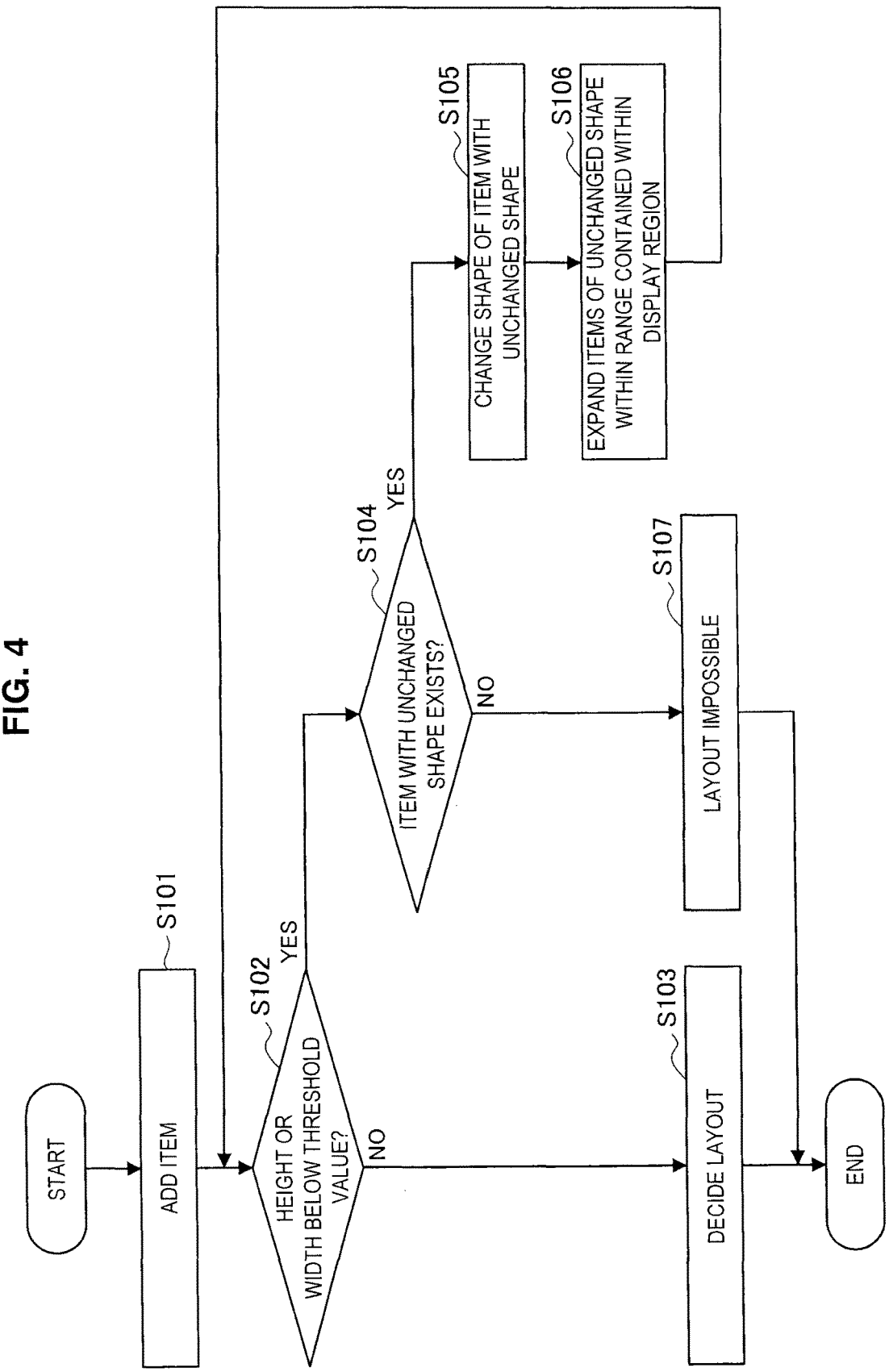
FIG. 4 is a flowchart illustrating exemplary operations of an information processing device 100 according to an embodiment of the present disclosure.

FIG. 4 is a flowchart illustrating exemplary operations of an information processing device 100 according to an embodiment of the present disclosure. The flowchart illustrated in FIG. 4 illustrates exemplary operations of the information processing device 100 in the case of displaying information on the information processing device 100. Note that the following illustrates operations of the information processing device 100 in the case in which information is displayed in multiple items on the display unit 112, and the number of the items is changed, or more particularly, increased. Hereinafter, FIG. 4 will be used to describe exemplary operations of an information processing device 100 according to an embodiment of the present disclosure.

Figure 5:
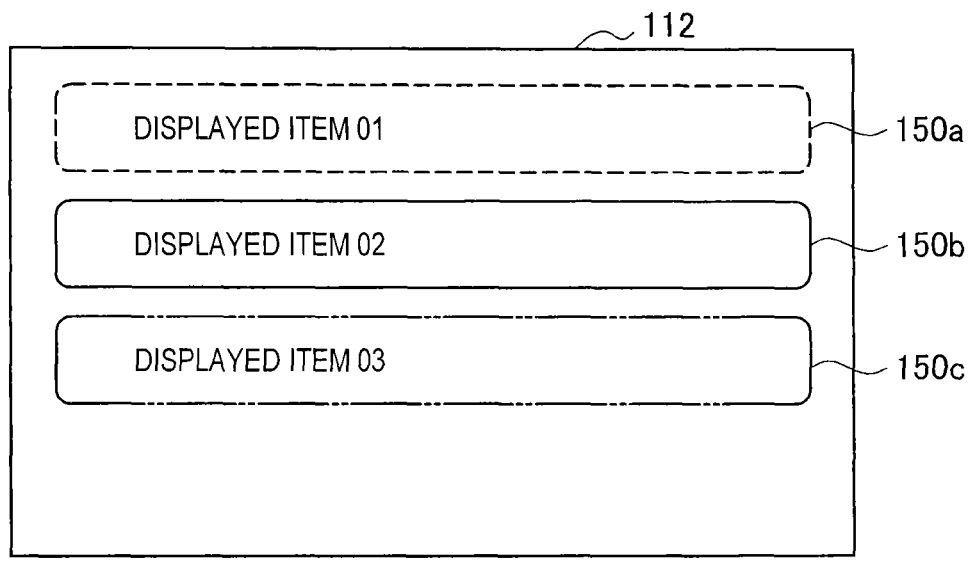
FIG. 5 is an explanatory diagram illustrating an example of a screen displayed on a display unit 112.

For example, as illustrated in FIG. 5, in the case of displaying the items 150*a*, 150*b*, and 150*c* in order from top to bottom on the display unit 112, the information processing device 100 executes a predetermined process, and thereby adds an item to display on the display unit 112 (S101). This addition of an item to the display unit 112 is executed by the display processing unit 123, for example. Also, the display on the display unit 112 is controlled so that the height of each item is the same for all items.

This predetermined process may be a process based on an operation on the information processing device 100 by the user, for example, but even if the user does not operate the information processing device 100, the information processing device 100 may receive information with the wireless communication unit 111, and the process may be a process based on the received information. The process based on an operation on the information processing device 100 by the user may be, for example, adding an item to display on the display unit 112 due to the user operating the operating unit 116. The process based on information received by the information processing device 100 with the wireless communication unit 111 may be, for example, a process that searches for a wireless LAN access point, and displays a discovered access point on the display unit 112.

In the above step S101, after adding an item to display on the display unit 112, next, the information processing device 100 judges whether or not, as a result of adding an item, the height (or width) of the items being displayed on the display unit 112 has fallen below a predetermined threshold value (step S102). This judgment is executed by the region control unit 122, for example.

If, as a result of the judgment in the above step S102, the height (or width) of the items being displayed on the display unit 112 has not fallen below the predetermined threshold value, the information processing device 100 decides a display layout of the items on the display unit 112 according to the addition of an item (step S103).

Figure 6:
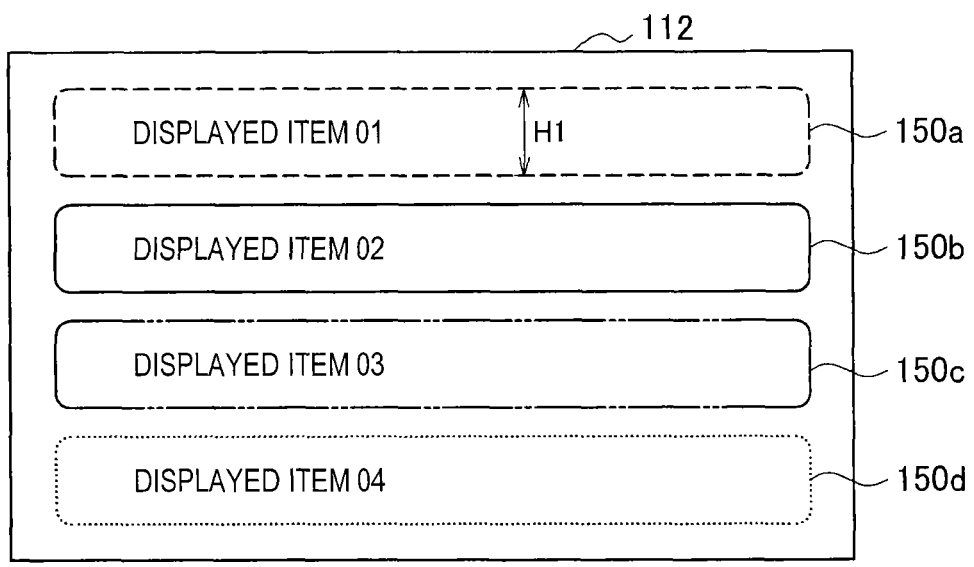
FIG. 6 is an explanatory diagram illustrating an example of a screen displayed on a display unit 112.

FIG. 6 is an explanatory diagram illustrating an example of a screen displayed on a display unit 112. FIG. 6 illustrates a state in which one item has been added from the state of FIG. 5, and the four items 150*a*, 150*b*, 150*c*, and 150*d* are being displayed on the display unit 112. Subsequently, if the height H1 of each displayed item has not fallen below a predetermined threshold value H0, the information processing device 100 decides a display layout of items on the display unit 112 so that the added item is displayed as-is.

On the other hand, if, as a result of the judgment in the above step S102, the height (or width) of the items being displayed on the display unit 112 has fallen below the predetermined threshold value, the information processing device 100 subsequently judges whether or not an item with an unchanged shape exists (step S104). The judgment in step S104 is executed by the region control unit 122, for example. In addition, the predetermined threshold value is decided with consideration for the limit of a user being able to select an item using a finger. If the threshold value is configured as a number of dots, the threshold value may also vary depending on the screen size of the display unit 112.

If, as a result of the judgment in the above step S104, an item with an unchanged shape does exist, the information processing device 100 subsequently executes control to change the shape of an item of unchanged shape (step S105). The shape-changing process in step S105 is executed by the region control unit 122, for example.

An example of an item shape-changing process will be described. When changing the shape of an item, first, at least a portion of the item of unchanged shape that is being displayed uppermost is changed in shape so that the height exceeds the threshold value. In addition, shape changing is successively conducted in the layout direction of the items, so that the top edge of the changed portion of the item adjacent below is higher than the bottom edge of the changed portion of the higher item. By successively conducting such a shape-changing process, even though the item spacing is still less than or equal to the predetermined threshold value, the height of the detection region with which the touch detection unit 121 detects contact or proximity by the user's finger may be made equal to or greater than the threshold value.

In the above step S105, after the information processing device 100 executes control to change the shape of an item of unchanged shape, the information processing device 100 executes control to enlarge items of unchanged shape below the items of changed shape within the range contained within the display region of the display unit 112 (step S106). The enlargement process in step S106 is executed by the region control unit 122, for example. After the enlargement process of step S106 ends, the information processing device 100 returns to the processing of the above step S102.

On the other hand, if, as a result of the judgment in the above step S104, an item with an unchanged shape does not exist, the information processing device 100 is unable to arranged items on the display unit 112, and thus ends on an impossible layout error (step S107).

If, as a result of a series of processes as illustrated in FIG. 4, the information processing device 100 according to the present embodiment displays multiple items arranged in a predetermined direction so that the height falls below the predetermined threshold value, by changing the shape of the items, it is possible to ensure operability for the user of the information processing device 100 and potentially improve the visibility of information.

Figure 7:
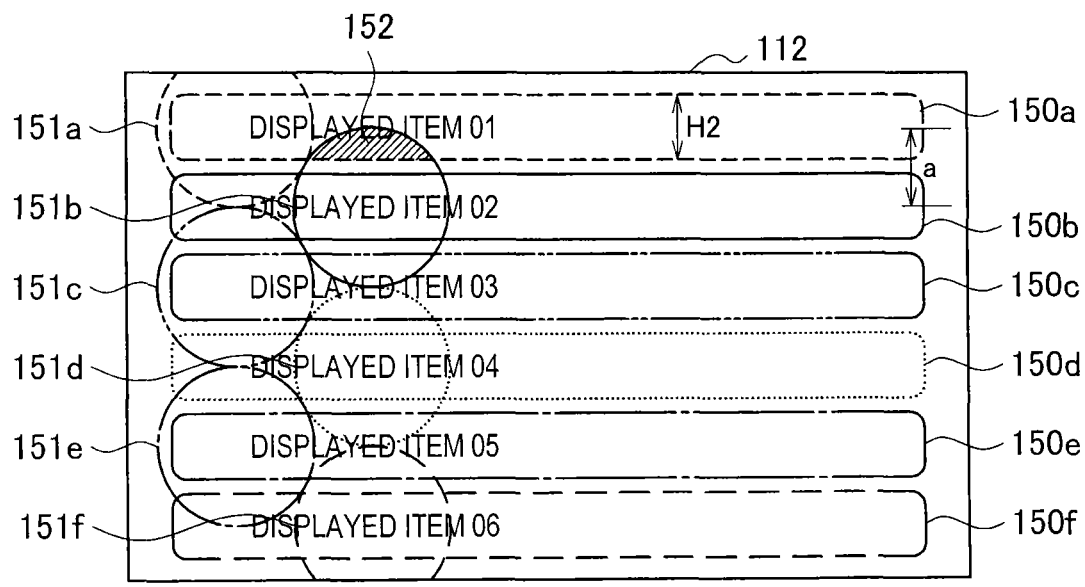
FIG. 7 is an explanatory diagram illustrating an example of a screen displayed on a display unit 112.

An example of region shape-changing by the region control unit 122 will now be described. FIG. 7 is an explanatory diagram illustrating an example of a screen displayed on a display unit 112. FIG. 7 illustrates a state in which the six items 150a, 150b, 150c, 150d, 150e, and 150f are being displayed on the display unit 112. If the height H2 of each item falls below the predetermined height H0, the region control unit 122 changes the shape of a portion of each item for display on the display unit 112, as illustrated in FIG. 7.

FIG. 7 illustrates a state in which circles 151a, 151b, 151c, 151d, 151e, and 151f having a diameter that is double the spacing between the horizontal centerlines of each item are drawn. For the odd-numbered items, the left edge of each item is aligned with the left edge of the circle, while for the even-numbered items, the circles are drawn farthest to the left within a range that does not contact the regions of circles for the items above and below.

By drawing each item in this way, the region control unit 122 ensures operability for the user of the information processing device 100, and in addition, since more items are displayed on the display unit 112, it is possible to potentially improve the visibility of information for the user of the information processing device 100.

Note that in FIG. 7, for the regions in which a rectangular region and a circular region overlap in the layout direction of each item (for example, the region indicated by the sign 152), the circular region is prioritized. In other words, if the user touches with his or her finger the region indicated by the sign 152 (or if the user's finger comes into proximity of the region indicated by the sign 152), the touch detection unit 121 judges that "Displayed item 02" has been selected.

Figure 8:
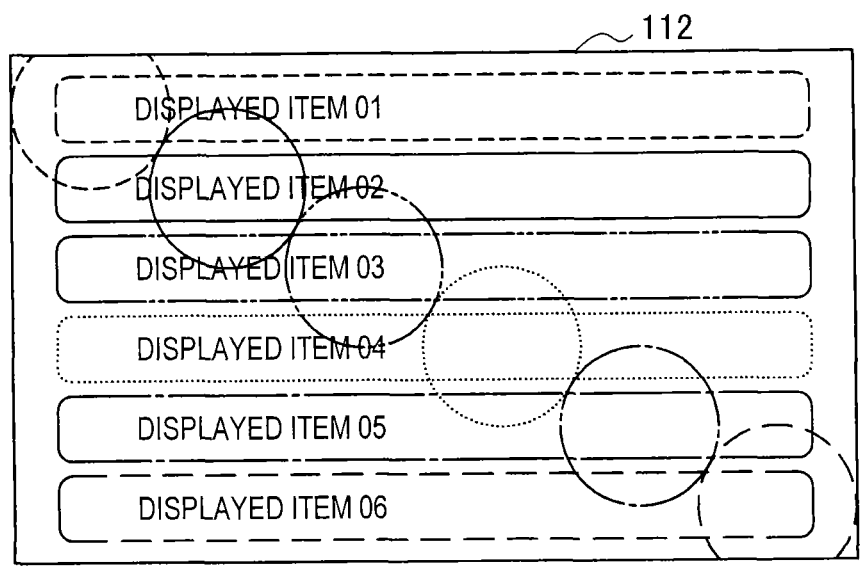
FIG. 8 is an explanatory diagram illustrating an example of a screen displayed on a display unit 112.

FIG. 8 is an explanatory diagram illustrating an example of a screen displayed on a display unit 112. Similarly to FIG. 7, FIG. 8 illustrates a state in which the six items 150a, 150b, 150c, 150d, 150e, and 150f are being displayed on the display unit 112. If the height H2 of each item falls below the predetermined height H0, the region control unit 122 changes the shape of a portion of each item for display on the display unit 112, as illustrated in FIG. 8.

Additionally, FIG. 8 illustrates a state in which the region control unit 122 draws, on the display unit 112, circles 151a, 151b, 151c, 151d, 151e, and 151f having a diameter that is double the spacing between the horizontal centerlines of each item. For the uppermost item, the region control unit 122 aligns the left edge of the item with the left edge of the circle, and thereafter, places the center of each circle on the horizontal centerline of each item while also placing each circle adjacent to the circle of the item neighboring above.

Figure 9:
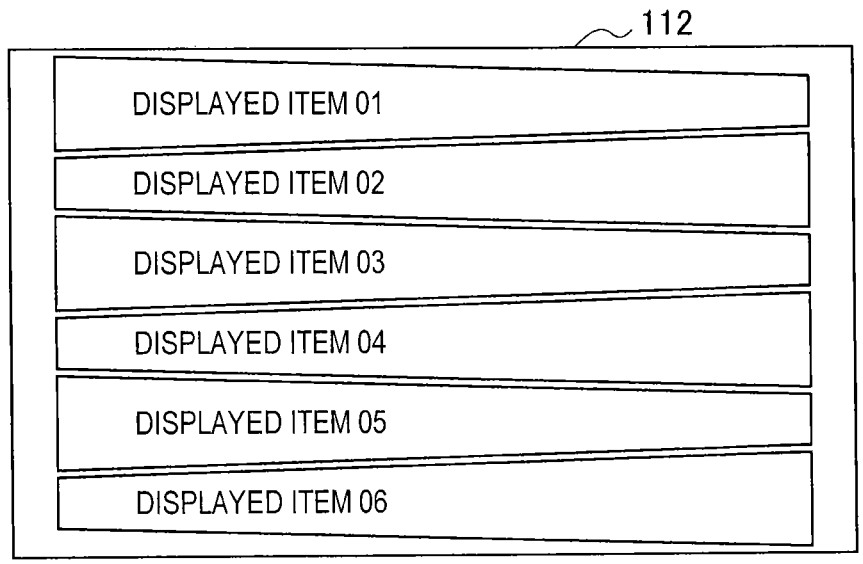
FIG. 9 is an explanatory diagram illustrating an example of a screen displayed on a display unit 112.

FIG. 9 is an explanatory diagram illustrating an example of a screen displayed on a display unit 112. Similarly to FIG. 7, FIG. 8 illustrates a state in which the six items 150a, 150b, 150c, 150d, 150e, and 150f are being displayed on the display unit 112.

FIG. 9 illustrates a state in which, if the height H2 of each item falls below the predetermined threshold value H0, the region control unit 122 changes the shape of each item into an isosceles trapezoid, and draws each item on the display unit 112. FIG. 9 illustrates a state in which the shape of each item is changed to an isosceles trapezoid so that the sum of the upper base and lower base becomes double the spacing between the horizontal centerline of each item. As illustrated in FIG. 9, the region control unit 122 draws by alternately switching the upper base and lower base of the isosceles trapezoid, and thereby ensures operability for the user of the information processing device 100. In addition, since more items are displayed on the display unit 112, it is possible to potentially improve the visibility of information for the user of the information processing device 100.

Figure 10:
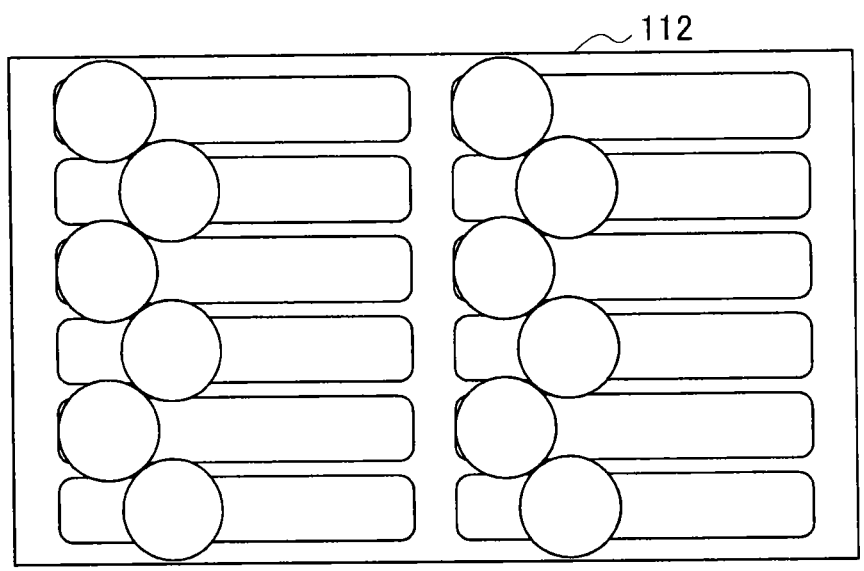
FIG. 10 is an explanatory diagram illustrating an example of a screen displayed on a display unit 112.

Note that although the foregoing examples are for the case of displaying a single column of items, the present disclosure is not limited to such an example. Even in the case of displaying two or more columns of items, by similarly changing the shape of the regions, the information processing device 100 is able to ensure operability and potentially improve the visibility of information for the user. For example, FIG. 10 illustrates an example of the case of displaying two or more columns of items. FIG. 10 is an explanatory diagram illustrating an example of a screen displayed on the display unit 112, and illustrates a state in which circles are alternately drawn as in FIG. 7.

Note that the transition due to the addition of an item from a state in which items are not changed in shape, as illustrated in FIG. 6, to a state in which items are not changed in shape, as illustrated in FIG. 7, may or may not be accompanied by animation. Also, the transition due to the addition of an item from a state in which items are not changed in shape, as illustrated in FIG. 6, to a state in which items are not changed in shape, as illustrated in FIG. 7, may be accompanied by movement of the information (label) being displayed in each item.

Figure 11:
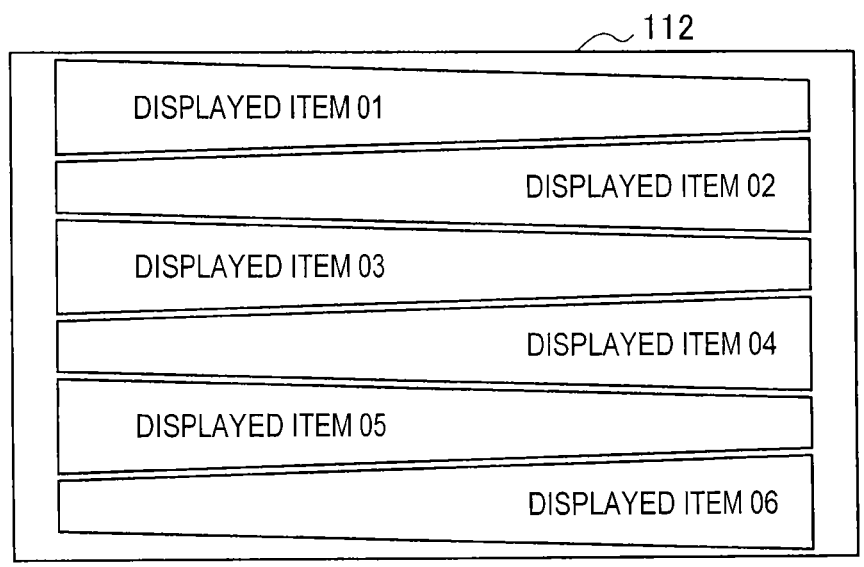
FIG. 11 is an explanatory diagram illustrating an example of a screen displayed on a display unit 112.

FIG. 11 is an explanatory diagram illustrating an example of a screen displayed on the display unit 112, and illustrates a state in which, if the height H2 of each item falls below the predetermined threshold value H0, as in FIG. 9, the region control unit 122 changes each item into an isosceles trapezoid, and draws each item on the display unit 112. In addition, FIG. 11 illustrates a state in which, from among the information being displayed in each item, the text being displayed in the items 150b, 150d, and 150f is moved to the right edge.

FIGS. 7 to 11 describe as an example a case in which the information processing device 100 displays six items on the display unit 112. In this case, in order to display seven or more items on the display unit 112, the user is required to scroll the display on the display unit 112. In the related art, if scrolling is required, control to display a scrollbar on the display unit 112 is conducted, but by drawing so that a detection region overlaps with the region of another item as in the present embodiment, the information processing device 100 according to the present embodiment is able to indicate the need to scroll without displaying a scrollbar.

Figure 12:
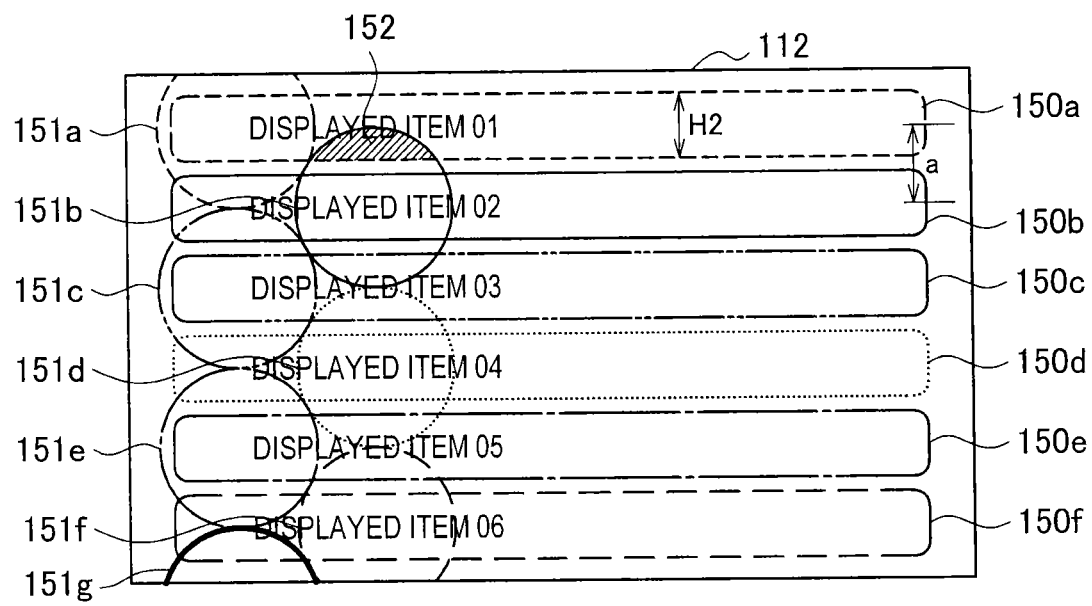
FIG. 12 is an explanatory diagram illustrating an example of a screen displayed on a display unit 112.

FIG. 12 is an explanatory diagram illustrating an example of a screen displayed on a display unit 112. FIG. 12 illustrates a state in which the six items 150a, 150b, 150c, 150d, 150e, and 150f, as well as the circles 151a, 151b, 151c, 151d, 151e, and 151f obtained by partially changing the shape of each item, are drawn on the display unit 112. In such a case, if a seventh item is produced, the region control unit 122 displays an arc 151g on the display unit 112. Consequently, the information processing device 100 is able to present to the user the existence of an item farther below the item 150f.

<2. Conclusion>

As described above, according to an embodiment of the present disclosure, there is provided a layout and display method/algorithm in which, on a screen for selecting items listed unidirectionally, by changing the shape of a detection region according to the number and shape of the items to display, operability is not lowered even if the surface area of the detection region becomes smaller. Also, since the order and positional relationships of items arranged unidirectionally do not vary over screen transitions due to the change in shape of the regions, recognition of the items that have changed in shape does not become difficult.

Additionally, as described above, according to an embodiment of the present disclosure, on a device using a touch panel as a user interface, a screen display that guarantees operability while also presenting information at higher density becomes possible.

The foregoing thus describes preferred embodiments of the present disclosure in detail and with reference to the attached drawings. However, the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure.

Each step in the processing carried out by each device of this specification does not necessarily have to be performed in a time series manner in accordance with the order indicated as a sequence diagram or a flow chart. For example, each step in the processing performed by each device may be processed in an order different from the order indicated as a flow chart or may be processed in parallel.

Moreover, a computer program which allows hardware, such as CPU, ROM, and RAM, built in each device to demonstrate a function equivalent to that of the configuration of each device described above can also be created. Moreover, a storage medium in which the computer program is stored can also be provided. Moreover, by constituting each functional block shown in the functional block diagram by hardware, a series of processing steps can also be realized by the hardware.

Figure 13:
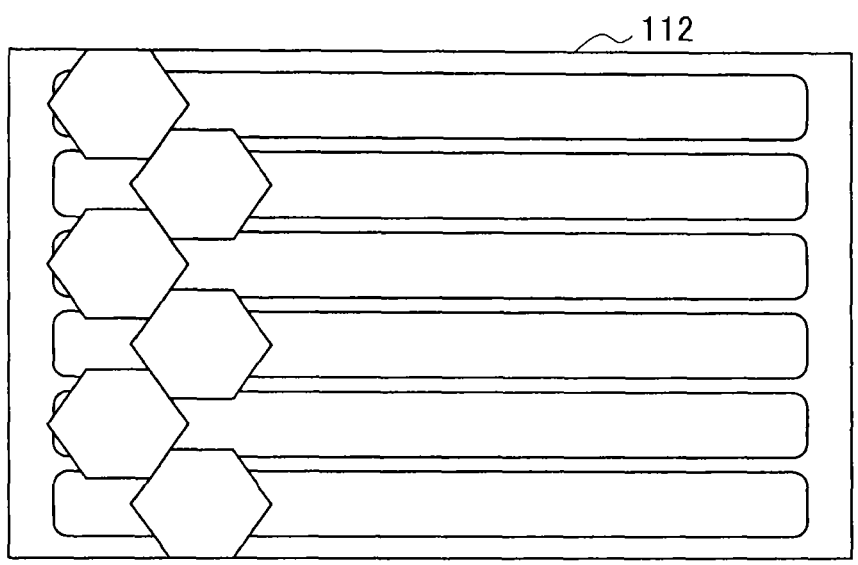
FIG. 13 is an explanatory diagram illustrating an example of a screen displayed on a display unit 112.

As another example, in the foregoing embodiment, a portion of the shape of an item is changed into a circle, but the present disclosure is not limited to such an example. A portion of each item may also be changed into a shape other than a circle, such as a hexagon as illustrated in FIG. 13, for example.

Additionally, the present technology may also be configured as below.

(1)

An information processing device including:
a region control unit that provides a plurality of objects arranged in a predetermined direction with a detection region that detects contact or proximity of a pointing member, and conducts control in a manner that a plurality of modes exist with differing states of overlap between ranges in the predetermined direction of the detection region for the objects that neighbor each other.

(2)

The information processing device according to (1), wherein
the region control unit conducts control to transition between two of the modes.

(3)

The information processing device according to (2), wherein
the region control unit conducts control to transition between two of the modes accompanied by animation.

(4)

The information processing device according to (3), wherein
the region control unit conducts control to transition between two of the modes while animating the detection region.

(5)

The information processing device according to (3) or (4), wherein
the region control unit conducts control to transition between two of the modes accompanied by movement of information displayed in the objects corresponding to the detection region.

(6)

The information processing device according to any of (1) to (5), wherein
the region control unit, when transitioning between two of the modes, conducts control to change at least part of the detection region to create overlap between regions of the objects that neighbor each other.

(7)

The information processing device according to (6), wherein
the region control unit changes at least part of the detection region into a circular shape.

(8)

The information processing device according to (7), wherein
the region control unit systematically changes at least part of the detection region into a circular shape along the predetermined direction.

(9)

The information processing device according to (8), wherein
the region control unit alternately changes at least part of the detection region into a circular shape along the predetermined direction.

(10)

The information processing device according to (8), wherein
the region control unit changes at least part of the detection region into a circular shape along the predetermined direction, and in a direction different from the predetermined direction.

(11)

The information processing device according to (6), wherein
the region control unit changes the detection region into a trapezoidal shape.

(12)

The information processing device according to (11), wherein
the region control unit changes the detection region into a trapezoidal shape in a manner that an upper base and a lower base alternate.

(13)

The information processing device according to any of (2) to (12), wherein
the region control unit conducts control to transition between two of the modes when the objects falls below a predetermined threshold value in width.

(14)

The information processing device according to any of (1) to (13), wherein
the region control unit conducts control in a manner that a mode in which the detection region overlaps with regions of the objects and a mode in which the detection region does not overlap with the regions of the objects are included.

(15)

An information processing method including:
a step of providing a plurality of objects arranged in a predetermined direction with a detection region that detects contact or proximity of a pointing member, and a step of conducting control in a manner that a plurality of modes exist with differing states of overlap between ranges in the predetermined direction of the detection region for the objects that neighbor each other.

(16)

A recording medium having a computer program recorded thereon, the computer program causing a computer to execute:
a step of providing a plurality of objects arranged in a predetermined with a detection region that detects contact or proximity of a pointing member, and a step of conducting control in a manner that a plurality of modes exist with differing states of overlap between ranges in the predetermined of the detection region for the objects that neighbor each other.

REFERENCE SIGNS LIST 100 information processing device
111 wireless communication unit
112 display unit
113 control unit
114 telephony unit
115 memory
116 operating unit
117 touch panel
121 touch detection unit
122 region control unit
123 display processing unit

The invention claimed is:

1. An information processing device, comprising:
memory configured to store instructions; and
a central processing unit (CPU) configured to execute the instructions stored in the memory, wherein the CPU is further configured to:
provide a plurality of objects arranged in a direction on a display screen,
wherein each object of the plurality of objects comprises an object region and a detection region, and
wherein the detection region detects one of contact or proximity of a pointing member;
control such that a plurality of modes exist, with different states of overlap in the direction between a first object region of a first object of the plurality of objects and a first detection region of a second object of the plurality of objects,
wherein the first object and the second object are a pair of adjacent objects of the plurality of objects;
control a transition between two modes of the plurality of modes based on a width of each of the plurality of objects that falls below a threshold value; and
change, based on the transition between the two modes of the plurality of modes, at least a part of the detection region of each of the plurality of objects such that the width of each of the plurality of objects at the detection region exceeds the threshold value.

2. The information processing device according to claim 1, wherein the CPU is further configured to control the transition between the two modes of the plurality of modes accompanied by an animation.

3. The information processing device according to claim 2, wherein the CPU is further configured to control the transition between the two modes of the plurality of modes accompanied by an animation of the detection region of each of the plurality of objects.

4. The information processing device according to claim 2, wherein the CPU is further configured to control the transition between the two modes of the plurality of modes accompanied by movement of information displayed in the plurality of objects.

5. The information processing device according to claim 1, wherein based on the transition between the two modes of the plurality of modes, the CPU is further configured to change the at least the part of the detection region of each of the plurality of objects to create an overlap between the detection region of each of the plurality of the objects and object regions of adjacent objects.

6. The information processing device according to claim 1, wherein the CPU is further configured to change at least the part of the detection region, of each object of the plurality of objects, into a circular shape.

7. The information processing device according to claim 6, wherein the CPU is further configured to systematically change at least the part of the detection region, of each object of the plurality of objects, into the circular shape along the direction.

8. The information processing device according to claim 7, wherein the CPU is further configured to alternately change at least the part of the detection region, of each object of the plurality of objects, into the circular shape along the direction.

9. The information processing device according to claim 7, wherein the CPU is further configured to change at least the part of the detection region, of each object of the plurality of objects, into the circular shape along each of the direction and a first direction, and wherein the first direction is different from the direction.

10. The information processing device according to claim 1, wherein the CPU is further configured to change the detection region, of each object of the plurality of objects, into a trapezoidal shape.

11. The information processing device according to claim 10, wherein the CPU is further configured to change the detection region, of each object of the plurality of objects, into the trapezoidal shape such that an upper base and a lower base of the detection region alternate.

12. The information processing device according to claim 1,
wherein the plurality of modes includes a first mode and a second mode,
wherein the CPU is further configured to control the transition between the first mode and the second mode such that both the first mode and the second mode exist, and wherein the detection region of each of the plurality of the objects overlaps with object regions of adjacent objects in the first mode and an overlap of the detection region with the object region is avoided in the second mode.

13. An information processing method, comprising:

providing a plurality of objects arranged in a direction on a display screen,
- wherein each object of the plurality of objects comprises an object region and a detection region, and
- wherein the detection region detects one of contact or proximity of a pointing member;

controlling such that a plurality of modes exist, with different states of overlap in the direction between a first object region of a first object of the plurality of objects and a first detection region of a second object of the plurality of objects,
- wherein the first object and the second object are a pair of adjacent objects of the plurality of objects;

controlling a transition between two modes of the plurality of modes based on a width of each of the plurality of objects that falls below a threshold value; and changing, based on the transition between the two modes of the plurality of modes, at least a part of the detection region of each of the plurality of objects such that the width of each of the plurality of objects at the detection region exceeds the threshold value.

14. A non-transitory computer-readable medium having stored thereon computer-readable instructions, which when executed by a computer, cause the computer to execute operations, the operations comprising:

providing a plurality of objects arranged in a direction on a display screen,
- wherein each object of the plurality of objects comprises an object region and a detection region, and
- wherein the detection region detects one of contact or proximity of a pointing member;

controlling such that a plurality of modes exist, with different states of overlap in the direction between a first object region of a first object of the plurality of objects and a first detection region of a second object of the plurality of objects,
- wherein the first object and the second object are a pair of adjacent objects of the plurality of objects;

controlling a transition between two modes of the plurality of modes based on a width of each of the plurality of objects that falls below a threshold value; and changing, based on the transition between the two modes of the plurality of modes, at least a part of the detection region of each of the plurality of objects such that the width of each of the plurality of objects at the detection region exceeds the threshold value.

* * * * *